United States Patent
Davis et al.

(10) Patent No.: US 7,485,695 B2
(45) Date of Patent: *Feb. 3, 2009

(54) POLYCARBONATES CONTAINING LOW LEVELS OF METHYL SALICYLATE PREPARED BY A MELT POLYMERIZATION IN A REACTIVE EXTRUDER

(75) Inventors: Peter Davis, Niskayuna, NY (US); Hans Looij, Bergen op Zoom (NL)

(73) Assignee: Sabic Innovative Plastics IP B.V, Bergen op Zoom (NL)

( * ) Notice: Subject to any disclaimer, the term of this patent is extended or adjusted under 35 U.S.C. 154(b) by 192 days.

This patent is subject to a terminal disclaimer.

(21) Appl. No.: 11/470,333

(22) Filed: Sep. 6, 2006

(65) Prior Publication Data

US 2007/0142618 A1    Jun. 21, 2007

Related U.S. Application Data

(63) Continuation-in-part of application No. 11/275,266, filed on Dec. 21, 2005.

(51) Int. Cl.
*C08G 64/00* (2006.01)
*C08G 63/02* (2006.01)

(52) U.S. Cl. ............... 528/196; 264/176.1; 264/219; 422/129; 528/198; 528/310

(58) Field of Classification Search ............ 264/176.1, 264/219; 422/129; 528/196, 198, 310
See application file for complete search history.

(56) References Cited

U.S. PATENT DOCUMENTS

| | | | |
|---|---|---|---|
| 4,323,668 A | 4/1982 | Brunelle | |
| 5,091,591 A | 2/1992 | Cipullo | |
| 5,151,491 A | 9/1992 | Sakashita et al. | |
| 5,276,129 A | 1/1994 | Sakashita et al. | |
| 5,525,701 A | 6/1996 | Tominari et al. | |
| 5,696,222 A | 12/1997 | Kaneko et al. | |
| 6,177,536 B1 | 1/2001 | Anamizu et al. | |
| 6,252,036 B1 | 6/2001 | Hatono et al. | |
| 6,300,459 B1 | 10/2001 | Kaneko et al. | |
| 6,303,734 B1 | 10/2001 | Funakoshi et al. | |
| 6,399,739 B1 | 6/2002 | McCloskey et al. | |
| 6,403,754 B1 | 6/2002 | McCloskey et al. | |
| 6,410,777 B1 | 6/2002 | Kaneko et al. | |
| 6,417,291 B1 | 7/2002 | Kaneko et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 6,525,163 B1 | 2/2003 | Brack et al. | |
| 6,548,623 B2 | 4/2003 | Brunelle et al. | |
| 6,590,068 B2 | 7/2003 | Brack et al. | |
| 6,600,004 B1 | 7/2003 | McCloskey et al. | |
| 6,653,434 B2 | 11/2003 | Brack et al. | |
| 6,706,846 B2 | 3/2004 | Brack et al. | |
| 6,710,156 B2 | 3/2004 | Whitney et al. | |
| 6,723,823 B2 | 4/2004 | McCloskey et al. | |
| 6,734,277 B2 | 5/2004 | Brack et al. | |
| 6,747,119 B2 | 6/2004 | Brack et al. | |
| 6,790,929 B2 | 9/2004 | Silvi et al. | |
| 2002/0132957 A1 | 9/2002 | Brack et al. | |
| 2003/0050427 A1 | 3/2003 | Brunelle et al. | |
| 2003/0232957 A1* | 12/2003 | Silvi et al. ............... | 528/86 |
| 2004/0068086 A1 | 4/2004 | Day et al. | |
| 2004/0087756 A1 | 5/2004 | Ramesh et al. | |
| 2005/0234211 A1 | 10/2005 | Martinez et al. | |
| 2006/0069228 A1 | 3/2006 | McCloskey et al. | |

FOREIGN PATENT DOCUMENTS

| | | |
|---|---|---|
| DE | 2439552 | 2/1976 |
| JP | 5009282 | 1/1993 |
| JP | 10101786 | 4/1998 |
| JP | 10101787 | 4/1998 |
| JP | 11302228 | 11/1999 |
| JP | 2000129112 | 5/2000 |
| JP | 2002309015 | 10/2002 |
| WO | 03/010220 A1 | 2/2003 |
| WO | 03040208 | 5/2003 |
| WO | 03106149 | 12/2003 |

* cited by examiner

Primary Examiner—Terressa M Boykin
(74) Attorney, Agent, or Firm—Marina Larson & Associates, LLC

(57) ABSTRACT

Polycarbonate is prepared by reactive extrusion on a reactive extruder. A method incorporates the steps of introducing a polycarbonate oligomer, an activated carbonate, and a transesterification catalyst to the extruder through a feed section. The extruder has a feed section, a polycarbonate exit section, and a reaction section between the feed section and the polycarbonate exit section. The reaction section has one or more devolatilization units, wherein each devolatilization unit incorporates an array of vent-conveying sections and conveying sections arranged in a configuration of: $(C\ V\ C)_x(V)_n$, and/or $(V\ C\ V)_x(C)_n$. (V) is a vent-conveying section, (C) is a conveying section, x is 1 or more, and n is 1 or 0. The extruder screw in the vent-conveying sections and the conveying sections in each devolatilization unit have conveying elements or conveying elements and mixing elements and no elements that create a melt seal in the devolatilization unit. The method further includes the step of extruding the reaction components at a temperature in a range between 100° C. and 500° C., wherein during the extrusion of the reaction components, activated carbonate residue is removed through the vent-conveying sections.

36 Claims, 11 Drawing Sheets

POLYCARBONATES CONTAINING LOW LEVELS OF METHYL SALICYLATE PREPARED BY A MELT POLYMERIZATION IN A REACTIVE EXTRUDER

RELATED APPLICATION

This is a continuation-in-part application of copending U.S. patent application Ser. No. 11/275,266 filed on Dec. 21, 2005, which is incorporated herein by reference for all purposes.

BACKGROUND

Polycarbonates prepared by the melt reaction of dihydroxy compounds with an ester-substituted diaryl carbonate produce salicylate compounds as a by-product. For example, where polycarbonate is produced by the melt reaction of bisphenol A and bis-methyl salicyl carbonate this by-product is methyl salicylate. The reaction is fast enough to proceed in a reactive extruder. While the reaction progresses in the extruder the methyl salicylate by-product is removed through vent ports along the length of the extruder. Further, it is desirable to have only minimal amounts of the salicylate by-product in the resulting polycarbonate. It is also desirable to maximize the throughput of the extruder. However, the higher rate of throughput of the extruder results in a higher amount of the salicylate by-product produced. It would be extremely beneficial to produce polycarbonate on an extruder with a high throughput while minimizing the by-product salicylate contained in the product.

SUMMARY OF INVENTION

It has now been found that altering the screw design of a reactive extruder by replacing a kneading section with a conveying section and/or a vent-conveying section has the surprising result of reducing the amount residual ester-substituted phenol present in the resulting product polycarbonate. Furthermore in the conveying sections and/or vent-conveying sections of preferred embodiments the extruder screw configuration has both mixing elements and conveying elements. In accordance with an embodiment of the present invention, an extruder is provided having a feed section, a polycarbonate exit section, and a reaction section between the feed section and the polycarbonate exit section. The reaction section has one or more devolatilization units. The devolatilization unit has an array of vent-conveying sections and conveying sections arranged in a configuration selected from the group consisting of:

$(CVC)_x(V)_n$, and $(VCV)_x(C)_n$ wherein (V) is a vent-conveying section, (C) is a conveying section, x is 1 or more, and n is 1 or 0. The extruder screw in the vent-conveying sections and the conveying sections in each devolatilization unit comprises screw elements selected from the group consisting of mixing elements and conveying elements and no elements that create a melt seal in the devolatilization unit.

In accordance with another embodiment of the present invention, a method is provided which incorporates the steps of introducing a dihydroxy compound, an activated carbonate, and a transesterification catalyst to the extruder described above through the feed section. The method further includes the step of extruding the reaction components at a temperature in a range between 100° C. and 500° C., wherein during the extrusion of the reaction components, a volatile residue of the activated carbonate is removed through the devolatilization unit.

DETAILED DESCRIPTION

U.S. Pat. Nos. 6,420,512 and 6,790,929, herein incorporated by reference, disclose processes for the melt manufacture of polycarbonate from reaction components comprising an activated diaryl carbonate on reactive devolatilization extruders. The present invention discloses a superior extruder design and a method of using the extruder design to produce polycarbonate with low levels of residual activated carbonate residue. It has now been found that polycarbonate containing low levels of residual ester-substituted phenol can be produced on a reactive devolatilization extruder wherein the melt seals within the extruder are reduced or eliminated.

Figure 4:
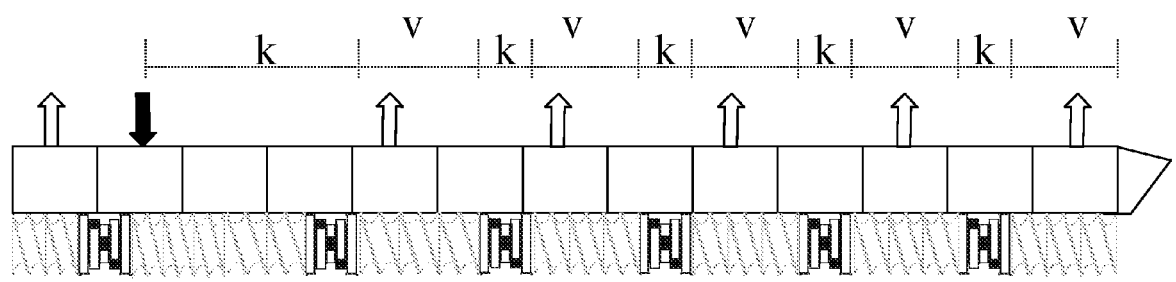
FIG. 4 shows a side view of a prior art extruder configuration.

Extruders of the past, as illustrated in FIG. 4, have configurations that incorporate a number of kneading sections separated by a number of vent-conveying sections. The kneading sections create melt seals within the extruder and provide areas that effect the intense mixing of reactions components and/or polymer thereby increasing the surface renewal of the same within the extruder. Surface renewal is the replenishment of ester-substituted phenol at the surface of the reaction components and/or polymer after or during the evaporation/devolatilization of such in the vent-conveying sections.

It has herein been found that altering the screw design of a reactive extruder to reduce melt seals by replacing a kneading section that creates a melt seal with a conveying section or vent-conveying section that creates no melt seal has the surprising result of significantly reducing the amount of residual ester-substituted phenol present in the resulting product polycarbonate. It is believed that the reduction of melt seals within the extruder increases the surface area for active devolatilization and thereby allows for the reduction of ester-substituted phenol in the final product polycarbonate.

However, as explained above kneading elements are useful in extruders as they generate areas of intense mixing within the extruder. This mixing is beneficial to ester-substituted phenol reduction in the product polycarbonate because surface renewal of the components within the extruder occurs in these melt seal regions. Thus in another embodiment of the present invention, the type of screw elements in the conveying and vent-conveying sections are selected such that mixing of the components and increased surface renewal occurs within the conveying and vent-conveying sections without the creation of a melt seal therein.

The present invention may be understood more readily by reference to the following detailed description of preferred embodiments of the invention and the examples included therein. In the specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the terms "polycarbonate oligomer" and "oligomeric polycarbonate" are synonymous and refer to a polycarbonate oligomer having a number average molecular weight of less than 7,000 Daltons and includes oligomeric polycarbonates comprising polycarbonate repeat units derived from one or more dihydroxy compounds.

As used herein, when describing a polycarbonate, the expression "polycarbonate repeat units derived from at least one dihydroxy compound" means a repeat unit incorporated into the polycarbonate by reaction of a dihydroxy compound with a source of carbonyl units, for example the reaction of bisphenol A with bis(methyl salicyl) carbonate.

As used herein, the term "high molecular weight polycarbonate" means polycarbonate having a number average molecular weight, $M_n$, of 7,000 Daltons or more.

As used herein, the term "mixture comprising an ester-substituted phenol and an oligomeric polycarbonate" refers to a liquid oligomeric polycarbonate comprising at least 5 percent by weight ester-substituted phenol.

As used herein, the term "melt polycarbonate" refers to a polycarbonate made by the transesterification of a diaryl carbonate with a dihydroxy compound.

"BPA" is herein defined as bisphenol A or 2,2-bis(4-hydroxyphenyl)propane.

The term "reaction section" as it used herein with regard to an extruder shall be understood to mean the portion of the extruder located between the first feed section and the polycarbonate exit section. The reaction section of the extruders of the present invention comprises one or more devolatilization units, wherein the devolatilization unit comprises an array of vent-conveying sections and conveying sections arranged in a configuration selected from the group consisting of:

$(CVC)_x(V)_n$, and $(VCV)_x(C)_n$ wherein (V) is a vent-conveying section, (C) is a conveying section, x is 1 or more, and n is 1 or 0. The extruder screw in the vent-conveying sections and the conveying sections in each of the devolatilization units comprises screw elements selected from the group consisting of mixing elements and conveying elements and no elements that create a melt seal within the devolatilization unit.

The term "section(s)" as it is used herein with reference to "kneading section(s)", "conveying section(s)", and "vent-conveying sections" shall be understood to mean a subsection of the reaction section of the extruder. Two of the same subsections described above when disposed back to back within the reaction section are herein considered one section. For example two conveying sections disposed next to each other are considered to be one conveying section.

A "devolatilization unit" is a subsection of the reaction section of the extruder comprising one or more vent-conveying sections and one or more conveying sections comprising the array described above.

The term "conveying section" is defined herein as a subsection of the reaction section of the extruder for facilitating the transport of reaction components and/or polymer toward the polycarbonate exit section without the creation of a melt seal in the extruder. Mixing of the reaction components and/or polymer may or may not occur in the conveying section. In one embodiment the conveying section is designed for the sole purpose of facilitating the transport of reaction components and/or polymer toward the polycarbonate exit section. In a preferred embodiment the conveying section is designed such that transportation of reaction components and/or polymer toward the polycarbonate exit section occurs while mixing of the reaction components and/or polymer within the section also occurs to increase surface renewal of the same without the creation of a melt seal in the section. In the embodiment wherein the conveying section is designed solely for transport of reaction components and/or polymer toward the polycarbonate exit section, the extruder screw configuration in the conveying section will consist of one or more conveying elements. In the embodiment where mixing of the reaction components and/or polymer is to occur in addition to transport, the extruder screw configuration in the conveying section will consist of mixing elements and conveying elements.

A "vent-conveying section" is defined herein as a conveying section, as it defined above, further comprising at least one vent port wherein during operation the extruder a volatile residue from the activated diaryl carbonate (i.e. ester-substituted phenol) is removed from the vent.

A "conveying element" is defined herein as an extruder screw element, having a spiral shaped channel, designed for the sole purpose of transportation of the reaction components and/or polymer toward the polycarbonate exit section of the extruder without the creation of a melt seal in the extruder.

A "mixing element" is an extruder screw element that mixes polymer without the formation of a melt seal. A "mixing element" may either facilitate or not facilitate the transport of reaction components and/or polymer toward the polycarbonate exit section.

The term "kneading section" is defined as a subsection of the reaction section of the extruder where intense mixing of the polymer and/or reaction components occurs and wherein a melt seal is created in the extruder. The extruder screw in a kneading section comprises at least one kneading element. A "kneading element" is defined herein as an extruder screw element designed for mixing of the polymer and/or reaction components, while creating a melt seal within the extruder. A kneading element may or may not facilitate the transport of polymer and/or reaction components toward the polycarbonate exit section while mixing and creating a melt seal. A neutral screw element that does not facilitate or hinder transportation but does create a melt seal is herein considered to be a kneading element.

The term "melt seal" is defined as a point in a kneading section where gases are prevented from freely flowing due to the presence of reaction components and/or polymer. Gases on one side of the melt seal flow toward and out of one vent, while gases on the other side of the melt seal flow toward and out of another vent. According to the embodiments of the present invention, a melt seal occurs at the point in a kneading section wherein a kneading element mixes the reaction components and/or polymer. The reaction components and polymer, if present, on the upstream feed port side of the melt seal flow to and through the melt seal toward the polycarbonate exit section of the extruder.

To illustrate the definitions of "mixing elements", "conveying elements", and "kneading elements", provided above, a screw element having a spiral shaped channel is considered to be a "conveying element" if when an extruder screw having the element is rotated in a single operating direction (e.g. clockwise) the transportation of polymer and/or reaction components toward the polycarbonate exit section is facilitated by the element without the creation of a melt seal. When the same extruder screw having the same screw element is rotated in the opposite direction (e.g. counterclockwise) the same screw element would herein be considered a "mixing element" if no melt seal occurs as mixing of the reaction components and/or polymer occurs. When the same extruder screw having the same screw element is rotated again in the opposite direction (e.g. counterclockwise) and a melt seal occurs, the screw element would be considered herein to be a kneading element.

The terms "vent port" and "vent" are used interchangeably herein.

The term "section(s)" as it is used herein with reference to "venting conveying section(s)" shall be understood to mean the respective part of the reaction section of the extruder located between two conveying sections, between two kneading sections, or between a conveying section and a kneading section. A final vent-conveying section may be disposed between the polycarbonate exit section and the final reaction subsection (kneading or conveying).

"Polycarbonate" refers to polycarbonates incorporating repeat units derived from at least one dihydroxy compound and includes copolyestercarbonates, for example a polycarbonate comprising repeat units derived from resorcinol, bisphenol A, and dodecandioic acid. Nothing in the description and claims of this application should be taken as limiting the polycarbonate to only one dihydroxy residue unless the context is expressly limiting. Thus, the application encompasses copolycarbonates with residues of 2, 3, 4, or more types of dihydroxy compounds. The term polycarbonate refers to either oligomers or larger polymers unless the context clearly indicates otherwise.

Numerical values in the specification and claims of this application reflect average values. Furthermore, the numerical values should be understood to include numerical values which are the same when reduced to the same number of significant figures and numerical values which differ from the stated value by less than the experimental error of the measurement technique used in the present application to determine the value.

The method of the invention effects both the conversion of dihydroxy compounds, oligomeric polycarbonate, or both dihydroxy compounds and oligomeric polycarbonate to a product polycarbonate having a higher molecular weight. The method of the invention also effects a separation of the volatile residue of the activated carbonate (i.e. the ester-substituted phenol) that may be initially present in a reaction mixture or that may be created during the polymerization reaction to form the product polycarbonate. It is preferred that the product polycarbonate produced by the method of the present invention be a high molecular weight polycarbonate having a number average molecular weight, $M_n$, greater than 7,000 Daltons. Additionally, the method provides for the removal of other volatile materials which may be present in the initial reaction mixture of oligomeric polycarbonate, or formed as by-products as the reaction components are transformed in the extruder to the product polycarbonate.

One embodiment of the present invention provides a method for preparing polycarbonate wherein the method comprises the steps of, (i) introducing to an extruder through one or more feed sections, a plurality of reaction components comprising a dihydroxy compound, an activated carbonate, and a transesterification catalyst, wherein the extruder comprises: (a) a first feed section; (b) a polycarbonate exit section; and (c) a reaction section disposed between the first feed section and the polycarbonate exit section, the reaction section comprising one or more devolatilization units, wherein each devolatilization unit comprises an array of vent-conveying sections and conveying sections arranged in a configuration selected from the group consisting of:

$(CVC)_x(V)_n$, and $(VCV)_x(C)_n$ wherein (V) is a vent-conveying section, (C) is a conveying section, x is 1 or more, and n is 1 or 0, wherein the extruder screw in the vent-conveying sections and the conveying sections in each devolatilization unit comprises screw elements selected from the group consisting of mixing elements and conveying elements and no elements that create a melt seal within the devolatilization unit, and (ii) extruding the plurality of reaction components at a temperature in a range between 100° C. and 500° C., wherein during the extrusion of the reaction components a volatile residue from the activated carbonate is removed from each devolatilization unit, and polycarbonate is removed through the polycarbonate exit section.

The Process:

In one embodiment of the present invention, a plurality of reaction components are introduced to an extruder through at least one feed section. The plurality of reaction components comprise a dihydroxy compound, an activated carbonate, and a transesterification catalyst and may be introduced together as a combined reaction mixture through a single feed section 103, 203 (as depicted in FIGS. 1 and 2) or introduced separately through a plurality of feed sections 303, 304 (as depicted in FIG. 3) disposed along the length of the extruder.

In another embodiment, the plurality of reaction components introduced to the extruder further comprise an oligomeric polycarbonate that is prepared by heating a dihydroxy compound with an ester-substituted diaryl carbonate in the presence of a transesterification catalyst prior to its introduction to the extruder. The reactants are typically combined in a vessel in a ratio between 0.95 and 1.3 moles, preferably between 1.0 and 1.05 moles of ester-substituted diaryl carbonate per mole of dihydroxy compound. The amount of transesterification catalyst employed is between $1\times10^{-8}$ and $1\times10^{-3}$, preferably between $1.0\times10^{-6}$ and $2.5\times10^{-4}$ moles of transesterification catalyst per mole of dihydroxy compound employed. Upon heating the mixture at one or more temperatures in a range from 100° C. to 500° C., preferably from 100° C. to 300° C., and still more preferably from 150° C. to 250° C., reaction occurs to produce a mixture comprising an equilibrium mixture of oligomeric polycarbonate, by-product ester-substituted phenol, transesterification catalyst, and low levels of the starting materials, dihydroxy compound and ester-substituted diaryl carbonate. This is referred to as "equilibrating" the reactants. Typically the equilibrium strongly favors the formation of product oligomeric polycarbonate and by-product ester-substituted phenol and only traces of the starting materials are observed. The "equilibrated" product mixture is then introduced into a devolatilizing extruder to effect removal of the by-product ester-substituted phenol while converting the oligomeric polycarbonate into a higher molecular weight product polycarbonate. Because the transesterification catalyst is typically neither consumed in the equilibration step nor removed prior to extrusion, there is typically no need to add additional catalyst during extrusion. Where no additional catalyst is added, the amount of catalyst present during the extrusion step (expressed in terms of moles of catalyst per mole of polycarbonate repeat units in the oligomeric polycarbonate) will closely approximate the amount of catalyst used in the equilibration step, expressed in moles of catalyst per mole of dihydroxy compound. The ester-substituted phenol typically makes up from 1% to 70% by weight of the total reaction components.

In another embodiment an alpha/beta transesterification catalyst system, as described below, is employed to prepare the high molecular weight polycarbonate. In this embodiment the plurality of reaction components introduced to the extruder further comprise an oligomeric polycarbonate that is prepared by heating a dihydroxy compound with an ester-substituted diaryl carbonate in the presence of an beta transesterification catalyst prior to its introduction to the extruder.

The reactants are typically combined in a vessel in a ratio between 0.95 and 1.3 moles, preferably between 1.0 and 1.05 moles of ester-substituted diaryl carbonate per mole of dihydroxy compound. The amount of alpha transesterification catalyst employed is between $1.0\times10^{-8}$ and $1\times10^{-3}$, preferably between $1.0\times10^{-6}$ and $2.5\times10^{-4}$ moles of alpha transesterification catalyst per mole of dihydroxy compound employed. Upon heating the mixture at one or more temperatures in a range from 100° C. to 500° C., preferably from 100° C. to 300° C., and still more preferably from 150° C. to 250° C., reaction occurs to produce a mixture comprising an equilibrium mixture of oligomeric polycarbonate, by-product ester-substituted phenol, transesterification catalyst, and low levels of the starting materials, dihydroxy compound and ester-substituted diaryl carbonate. This is referred to as "equilibrating" the reactants as described above. The "equilibrated" product mixture is then introduced into a devolatilizing extruder, described below, to effect removal of the by-product ester-substituted phenol while converting the oligomeric polycarbonate into a higher molecular weight product polycarbonate. In this embodiment, an alpha transesterification catalyst is introduced to the equilibrated product mixture either before its introduction to the extruder or while the product mixture is in the extruder.

The reaction components may be prepared by a variety of other methods in addition to the equilibration method described above and the method is not particularly limited. For example, oligomeric bischloroformates of bisphenols may be prepared by reaction of one or more bisphenols with phosgene under interfacial conditions in a methylene chloride water mixture at low pH. Such bischloroformates may then be further reacted under interfacial conditions with an ester-substituted phenol, for example methyl salicylate, to afford an oligomeric polycarbonate comprising ester-substituted terminal phenoxy groups in methylene chloride mixture. The product oligomeric polycarbonate in mixture may then be subjected to the method of the present invention. Catalysts employed during the interfacial reaction are typically removed from the mixture of the oligomeric polycarbonate in a series of washing steps in which the methylene chloride mixture of the oligomeric polycarbonate is washed repeatedly with water to remove sodium chloride. Under such circumstances, additional catalyst may be required and may be added during or just prior to the extrusion step.

The plurality of reaction components may be introduced to the extruder together as a combined reaction mixture or separately through additional feed sections as desired. However, it is often preferred that the reaction components be introduced as a combined mixture to the extruder through the feed section.

In one embodiment, a monofunctional phenol or an asymmetrical activated carbonate chainstopper is added to a mixture of an oligomeric polycarbonate comprising ester-substituted phenoxy terminal groups, said oligomeric polycarbonate being prepared using the equilibration technique described herein. The mixture is then subjected to extrusion devolatilization to afford a product polycarbonate incorporating terminal phenoxy groups derived from said chainstopper. Suitable monofunctional phenol chainstoppers include p-cumylphenol, t-butylphenol, phenol, and cardanol.

The Extruder and Extrusion Process:

The extruder used according to the method of the present invention is a reactive devolatilizing extruder. That is, it is an extruder adapted for separating substantial amounts of ester-substituted phenol from a mixture with the use of vents. Extruders suitable for use according to embodiments of the present invention include, inter alia, double screw extruders and other multiple screw extruders.

In one embodiment, the extruder comprises: (a) a first feed section; (b) a polycarbonate exit section; and (c) a reaction section, disposed between the first feed section and the polycarbonate exit section.

The reaction section comprises one or more devolatilization units, wherein each devolatilization unit comprises an array of vent-conveying sections and conveying sections arranged in a configuration selected from the group consisting of:

$(CVC)_x(V)_n$, and $(VCV)_x(C)_n$ wherein (V) is a vent-conveying section, (C) is a conveying section, x is 1 or more, and n is 1 or 0. The extruder screw in the vent-conveying sections and the conveying sections in each devolatilization unit comprise screw elements selected from the group consisting of mixing elements and conveying elements and no elements that create a melt seal within the devolatilization unit. In preferred embodiments the extruder screw configuration in at least some of the vent-conveying sections and/or the conveying sections in a devolatilization unit consist of solely conveying elements and preferably both mixing elements and conveying elements. In the most preferred embodiments the extruder screw configuration in all of the vent-conveying sections and/or the conveying sections in the devolatilization units consist of both mixing elements and conveying elements.

Extruders as they are used according to embodiments of the present invention are typically operated at a temperature in a range between 100° C. and 500° C. and at a screw speed being between 50 revolutions per minute (rpm) and 1200 rpm, preferably between 50 rpm and 500 rpm. The temperature and throughput parameters (such as screw speeds and flow rates) of the extruder operation, as well as the operating conditions used in an optional equilibration of the reaction mixture step described above, may be selected by one skilled in the art so as to minimize degradation of the dihydroxy compound used in the reaction components and to maximize the desired properties, such as transparency, of the resulting polycarbonate.

It is a general principle of extruder operation that as the feed rate is increased a corresponding increase in the screw speed must be made in order to accommodate the additional material being fed. Moreover, the screw speed determines the residence time of the material being fed to the extruder, here the reaction components comprising the oligomeric polycarbonate and transesterification catalyst. Thus the screw speed and feed rate are typically interdependent. It is useful to characterize this relationship between feed rate and screw speed as a ratio. Typically the extruder is operated such that the ratio of starting material introduced into the extruder in kilograms per hour to the screw speed expressed in rpm falls within a range of from 0.01 to 100.00, preferably from 0.05 to 1.50. For example, the ratio of feed rate to screw speed where the mixture comprising an oligomeric polycarbonate and transesterification catalyst is being introduced at 500 pounds per hour into an extruder being operated at 400 rpm is 1.25. The maximum and minimum feed rates and extruder screw speeds are determined by, among other factors, the size of the extruder, the general rule being the larger the extruder the higher the maximum and minimum feed rates.

Figure 1A:
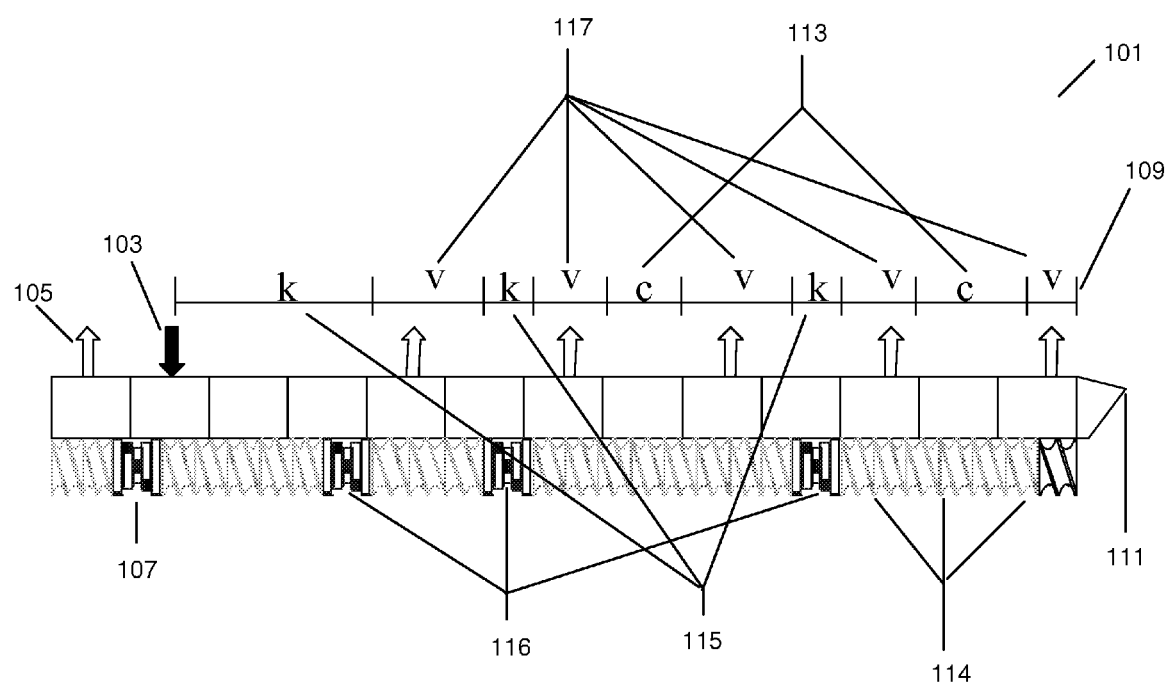
FIG. 1A shows a side view of an extruder configuration in accordance with the present invention.
Figure 1B:
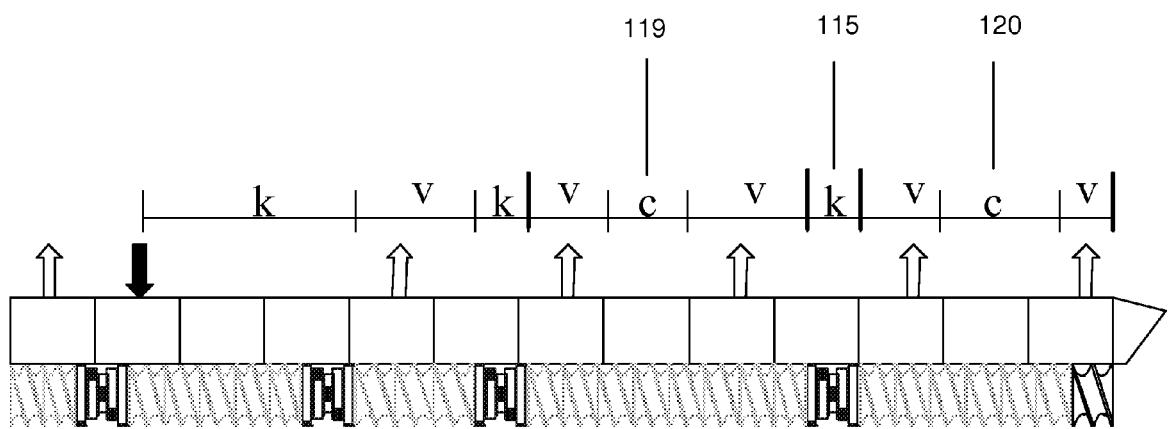
FIG. 1B shows a side view of an extruder configuration in accordance with the present invention.

FIG. 1A illustrates a design for a devolatilizing extruder 101 suitable for use according to an embodiment of the present invention. As illustrated in FIG. 1A, a plurality of reaction components comprising a dihydroxy compound, an activated carbonate, and a transesterification catalyst (and optionally a polycarbonate oligomer prepared according to above) are fed to extruder 101 either together as a combined reaction mixture or separately as individual feeds through feed section 103. The extruder 101 is operated at a temperature between 100° C. and 500° C., preferably between 200° C.

and 350° C., and at a screw speed between 50 and 1200 rpm. The extruder 101 is equipped with a back vent section 105 and an element 107 disposed between the back vent section 105 and the feed section 103. Preferably, element 107 is a mixing element but it may also be a conveying element. The extruder further has a reaction section 109, disposed between the feed section 103 and the polycarbonate exit section 111. The reaction section 109 comprises: two conveying sections 113 having screw element configurations consisting of conveying screw elements 114; three kneading sections 115 each comprising a kneading screw element 116, and five vent-conveying sections 117. The back vent section 105 and vent-conveying sections 117 comprise one or more vent ports that are suitably connected to house vacuum vents, other types of vacuums, or other types of manifolds for removal of ester-substituted phenol and other volatile by-products contained within the oligomeric feed and those formed as the oligomeric polycarbonate is converted into product polycarbonate within the extruder 101. The ester-substituted phenol vapors and other volatile by-products may then be condensed and recycled using standard recycling steps. As depicted in FIG. 1B, extruder 101 has two devolatilization units 119, 120 both arranged in a configuration of $(V\ C\ V)_1(C)_0$. Here the devolatilization units 119, 120 are separated by a kneading section 115.

Figure 1C:
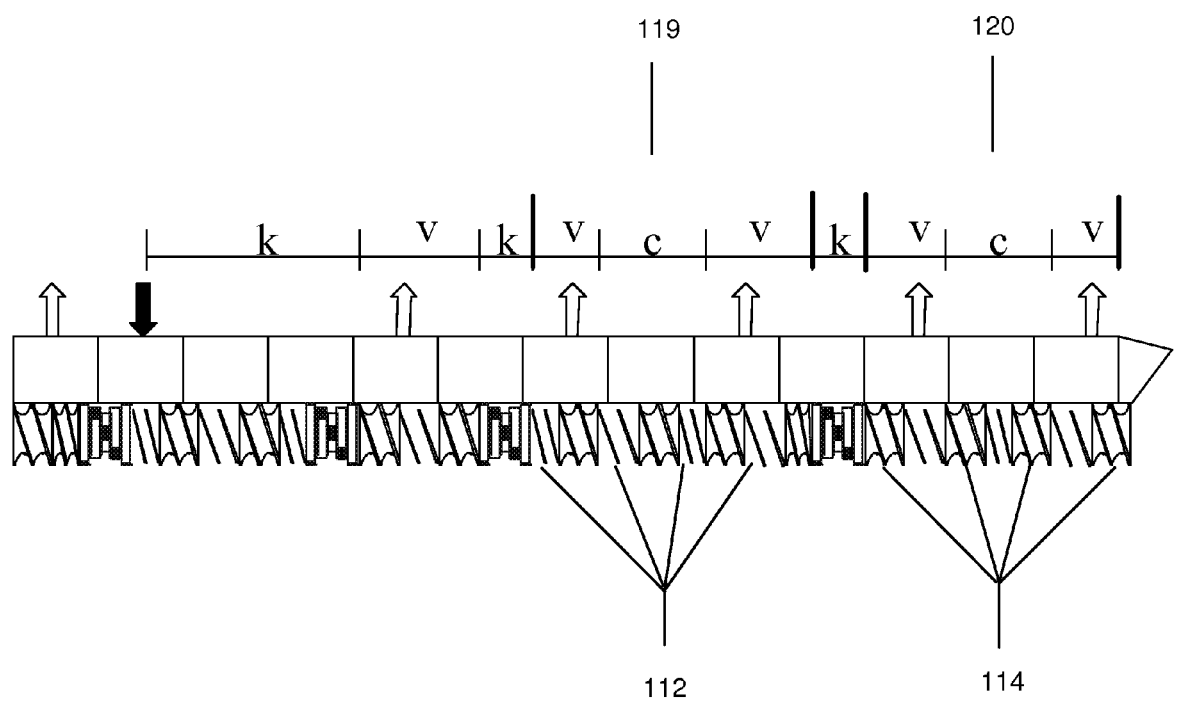
FIG. 1C shows a side view of an extruder configuration in accordance with the present invention.

The extruder screw in the conveying and vent-conveying sections of the devolatilization units comprises screw elements selected from the group consisting of mixing elements and conveying elements and no element that creates a melt seal in the devolatilization unit. In preferred embodiments the extruder screw in the vent-conveying sections and the conveying sections of each devolatilization unit consists of mixing elements and conveying elements. In further preferred embodiment the extruder screw configuration in the vent-conveying sections and the conveying sections comprise an array of mixing elements and conveying elements arranged in a configuration selected from the group consisting of:

$$((CE)(ME))_y(CE)_m, \text{ and}$$

$$((ME)(CE))_y(ME)_m$$

wherein CE is a conveying element, ME is a mixing element, and y is 2 or more, preferably 3 or more, and m is 1 or 0. FIG. 1C illustrates a preferred extruder screw for a devolatilization unit wherein the extruder screw in the conveying and vent-conveying sections of the devolatilization units 119, 120 consists of mixing elements 112 and conveying elements 114. In FIG. 1C, the screw element configuration in the first devolatilization unit 119 comprises an array of mixing and conveying elements arranged in a configuration of $((ME)(CE))_3(ME)_0$. The screw element configuration of the conveying and vent-conveying section result in the second devolatilization unit 120 comprises an array of mixing and conveying elements arranged in a configuration of $((CE)(ME))_3(CE)_1$.

In additional preferred embodiments the devolatilization units, kneading sections, and the vent-conveying sections outside of the devolatilization units comprise a configuration selected from the group consisting of:

$$KV(KVCV)_n, \tag{1}$$

$$(KV)_p(CV)_m, \text{ and} \tag{2}$$

$$(KV)_q(CV)_r(KV)_s \tag{3}$$

wherein K is a kneading section, V is a vent-conveying section, and C is a conveying section; n is 1, 2, or 3; p is 1, 2, or 3; m is 2, 3, or 4; q is 1, 2, or 3; r is 1 or 2; s is 1 or 2. In most preferred embodiments n is 2, p is 2, m is 3, q is 2, r is 1, and s is 1. In the vent-conveying sections outside of the devolatilization units the extruder screw comprises conveying elements, more preferably conveying and mixing elements, and no element that creates a melt seal.

In extruder configuration 101 shown in FIGS. 1A, 1B, and 1C the conveying sections, the kneading sections, and the vent-conveying sections within the reaction section are arranged in the following configuration K V(K V C V)n, wherein K is a kneading section, V is a vent-conveying section, C is a conveying section, and n is two.

Figure 2A:
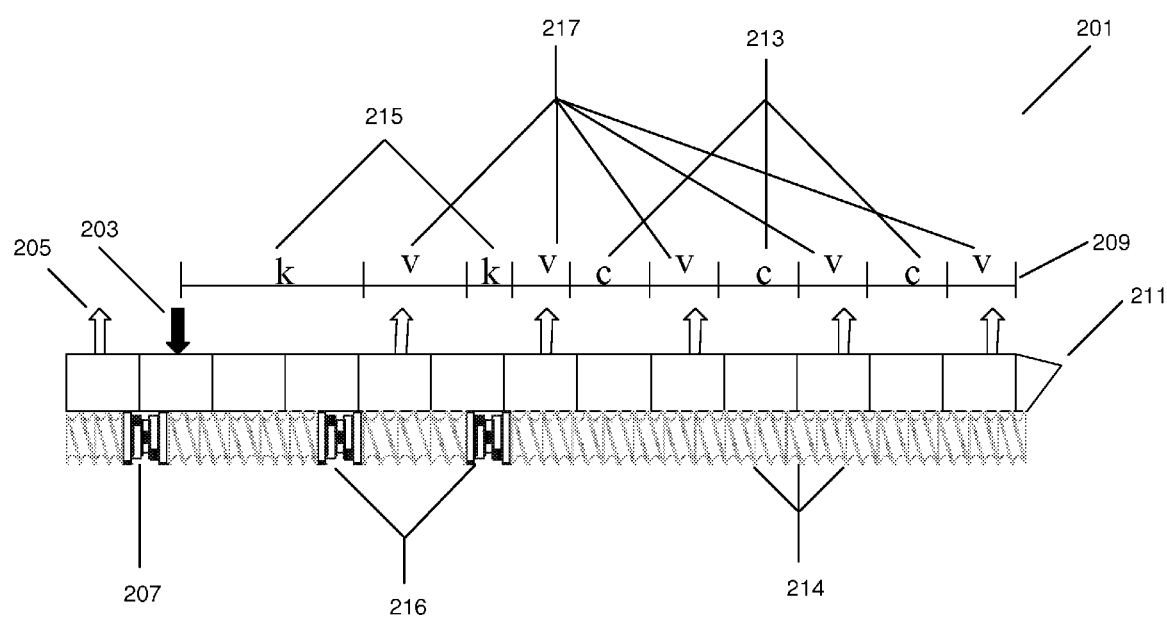
FIG. 2A shows a side view of an extruder configuration in accordance with the present invention.
Figure 2B:
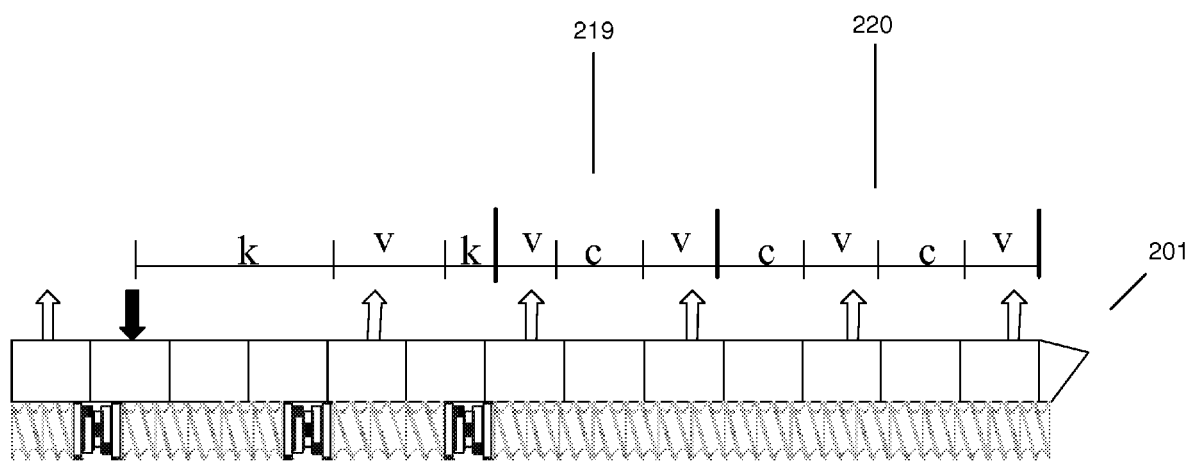
FIG. 2B shows a side view of an extruder configuration in accordance with the present invention.

FIG. 2A illustrates a design for a devolatilizing extruder 201, suitably operated at the conditions mentioned above, for use according to another embodiment of the present invention. As illustrated in FIG. 2A, a plurality of reaction components are fed to extruder 201 through feed section 203. Extruder 201 is equipped with a back vent section 205 and an element 207 disposed between the back vent section 205 and the feed section 203. As in FIG. 1A, element 207 is a mixing element. The extruder 201 further has a reaction section 209, disposed between the feed section 203 and the polycarbonate exit section 211. The reaction section 209 comprises: three conveying sections 213 having screw element configurations consisting of one or more conveying screw elements 214; a plurality of kneading sections 215 comprising a kneading screw element 216, and vent-conveying sections 217 wherein the vents are suitably connected to a vacuum for ester-substituted phenol removal. Vent-conveying sections 217 comprise a screw element configuration consisting of one or more conveying screw elements 214. In a preferred embodiment the screw element configuration in one or more of the vent-conveying sections would consists of mixing and conveying elements. In extruder configuration 201 the conveying sections 213, the kneading sections 215, and the venting conveying sections 217 are arranged in the following configuration $(K\ V)_p(C\ V)_m$, wherein K is a kneading section, V is a vent-conveying section, C is a conveying section, p is two, and m is 3. As depicted in FIG. 2B, extruder 201 has two devolatilization units 219, 220. Devolatilization unit 219 is arranged in the configuration of $(V\ C\ V)_1(C)_0$. Devolatilization unit 220 is arranged in the configuration of $(C\ V\ C)_1(V)_1$. Here the devolatilization units 219, 220 are disposed in the reaction section adjacent to one another.

Figure 3A:
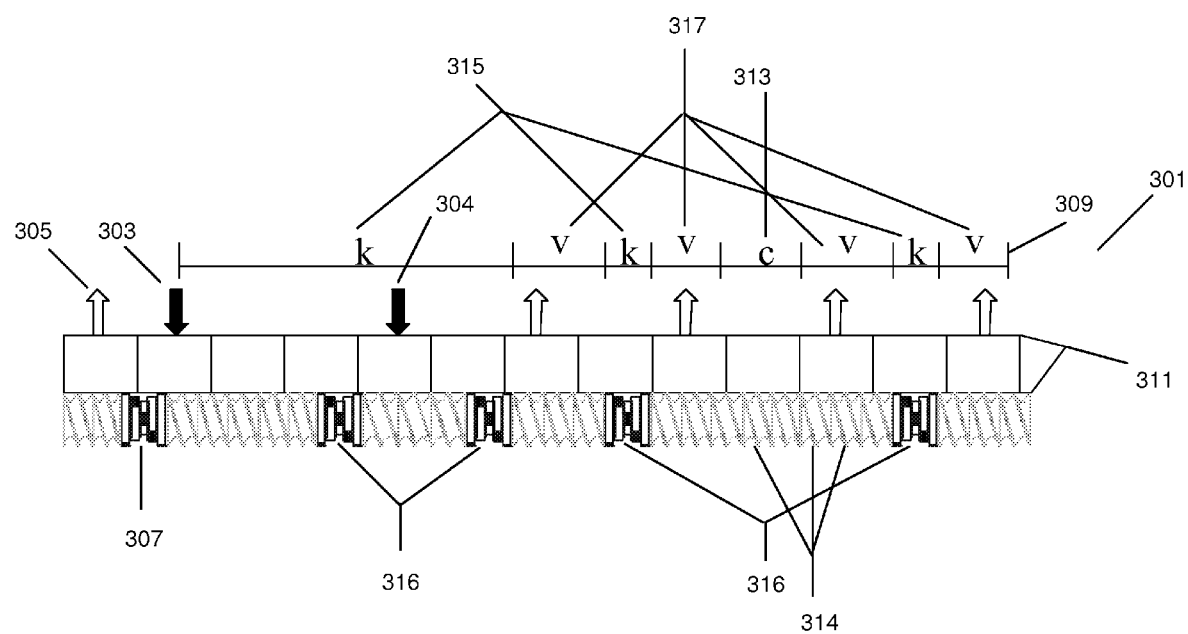
FIG. 3A shows a side view of an extruder configuration in accordance with the present invention.
Figure 3B:
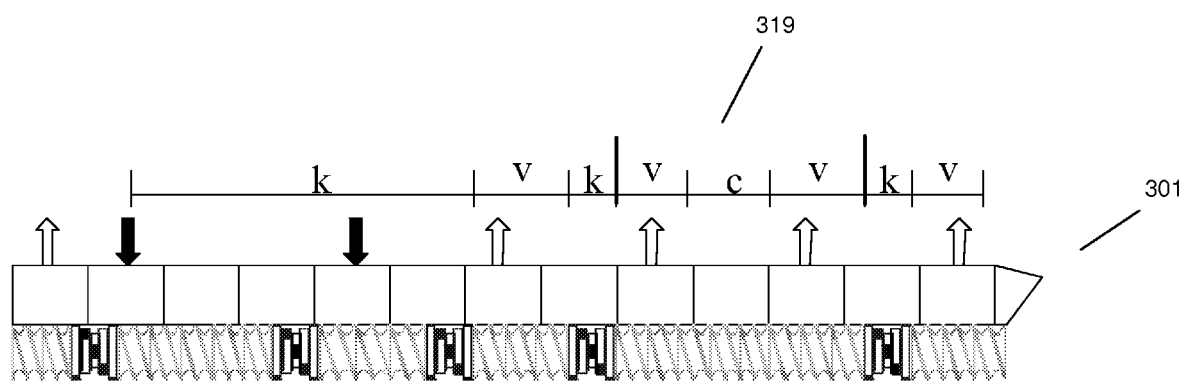
FIG. 3B shows a side view of an extruder configuration in accordance with the present invention.

FIG. 3A illustrates yet another design for a devolatilizing extruder 301, suitably operated at the conditions mentioned above, for use according to an embodiment of the present invention. As illustrated in FIG. 3A, a plurality of reaction components are fed to extruder 301 through feed sections 303, 304. The reaction components may be introduced together as a mixture or separately as individual components or as any combination of components through feed sections 303, 304. Extruder 301 is equipped with a back vent section 305 and an element 307 disposed between the back vent section 305 and the first feed section 303. As in FIGS. 1 and 2, element 307 is a mixing element, however, it may also be a conveying element 314. The extruder 301 further has a reaction section 309, disposed between the first feed section 303 and the polycarbonate exit section 311. The reaction section 309 comprises: one conveying section 313 having screw element configurations consisting of one or more conveying screw elements 314; three kneading sections 315 each comprising at least one kneading screw element 316 wherein the first kneading section comprises two kneading screw elements 316, and four vent-conveying sections 317 wherein the vents are suitably connected to a vacuum for ester-substituted phenol removal. Vent-conveying sections 317 comprise a screw element configuration consisting of one or more conveying screw elements 314. In preferred embodiments the screw element configuration in these sections consists of mixing and conveying elements as described with reference to FIG. 1C. In extruder configuration 301 the conveying section 313, the kneading sections 315, and the vent-conveying sections 317 are arranged in the following configuration $(KV)_q (CV)_r (KV)_s$, wherein K is a kneading section, V is a vent-conveying section, C is a conveying section, q is two, r is 1, and s is 1. As depicted in FIG. 3B, extruder 301 has one devolatilization unit 319. Devolatilization unit 319 is arranged in the configuration of $(V\ C\ V)_1 (C)_0$.

Figure 7:
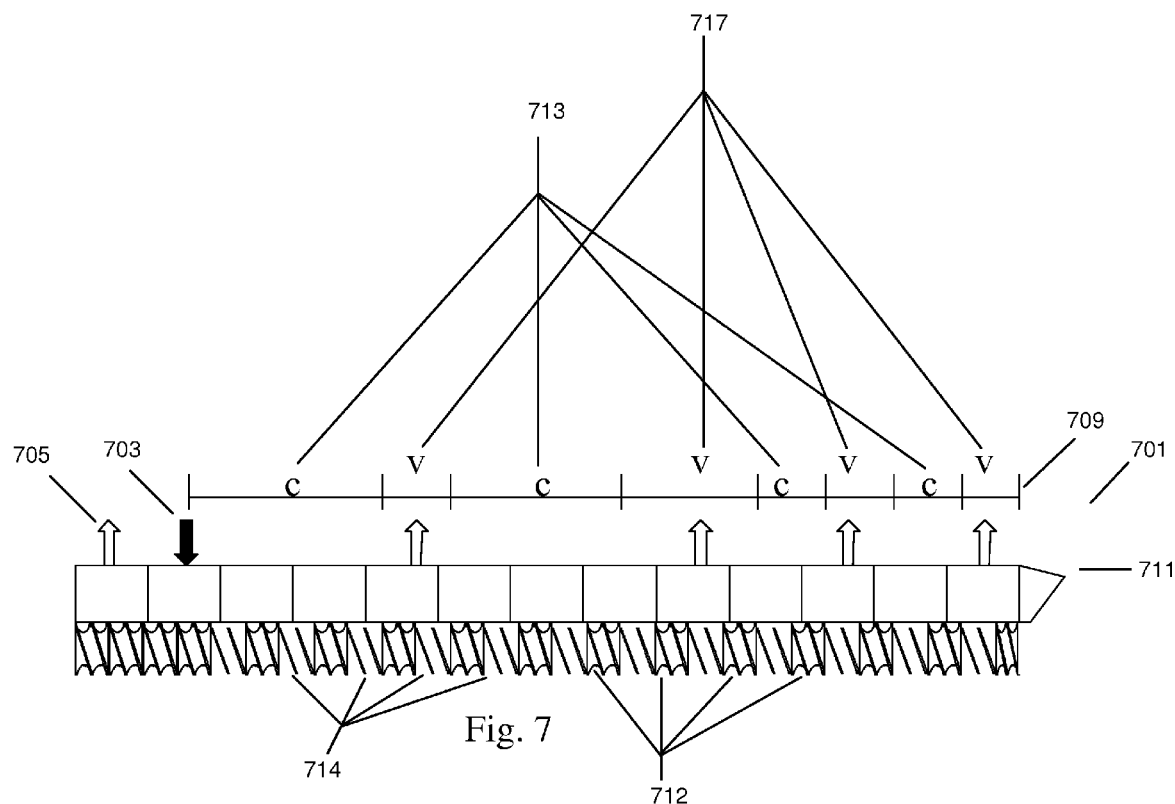
FIG. 7 shows a side view of an extruder configuration in accordance with the present invention.

FIG. 7 depicts yet another extruder design 701 in accordance with the present invention and suitably operated at the conditions mentioned above. As illustrated in FIG. 7, a plurality of reaction components are fed to extruder 701 through feed section 703. The reaction components may be introduced together as a mixture or separately as individual components or as any combination of components through feed section 703. Extruder 701 is equipped with a back vent section 705. No active element (i.e. a mixing element or kneading element) is disposed between the back vent section 705 and the first feed section 703. The extruder 701 further has a reaction section 709, disposed between the first feed section 703 and the polycarbonate exit section 711. The reaction section 709 comprises: four conveying sections 713 having screw element configurations consisting of one or more conveying screw elements 714 and mixing elements 712; no kneading sections, and four vent-conveying sections 717 wherein the vents are suitably connected to a vacuum for ester-substituted phenol removal. Vent-conveying sections 717 comprise a screw element configuration consisting of mixing 712 and conveying 714 screw elements. In the present preferred embodiment the extruder screw configuration in the vent-conveying sections and the conveying sections comprises arrays of mixing elements and conveying elements arranged in a configuration selected from the group consisting of $((CE)(ME))_y(CE)_m$ and $((ME)(CE))_y(ME)_m$ wherein CE, ME, y, and m are as described above. The present embodiment illustrates a total extruder screw configuration of the reaction section of the extruder wherein conveying elements and mixing elements are disposed in an alternating fashion along the length of the extruder. In one embodiment extruder 701 has two devolatilization units each arranged in a configuration of $(C\ V\ C)_1(V)_1$. In another embodiment extruder 701 has two devolatilization units, the first arranged in a configuration of $(C V C)_1(V)_0$ and the second arranged in a configuration of $(V C V)_1(C)_1$ with a vent conveying section disposed between the last devolatilization unit and the polycarbonate exit 711.

In one embodiment of the present invention, a mixture of an oligomeric polycarbonate and an ester-substituted phenol is heated under pressure to produce a "superheated" mixture, meaning that the temperature of said superheated mixture is greater than the boiling point of the ester-substituted phenol at a flash pressure. Typically, the temperature of the superheated oligomeric polycarbonate will be between 2° C. and 200° C. higher than the boiling point of the ester-substituted phenol at the flash pressure. Superheating of the mixture of the oligomeric polycarbonate may be achieved by heating the mixture under pressure, typically at a pressure less than 10 atmospheres. Superheated mixtures of oligomeric polycarbonates are conveniently prepared in pressurized heated feed tanks, pressurized heat exchangers, extruders, pressurized reaction vessels and the like. The superheated mixture is then introduced into the vented devolatilizing extruder through a pressure control valve having a cracking pressure higher than the flash. The back pressure generated by the pressure control valve prevents evaporation of the ester-substituted phenol prior to introducing the mixture into the extruder. Typically, the pressure control valve is attached (plumbed) directly to the extruder and serves as the principal feed inlet of the vented extruder. The ratio of the pressure of the first vent-conveying section/feed pressure is typically in a range of greater than 0.01 and less than 1.00, and sometimes more preferably from 0.10 to 1.00.

The extruder can be equipped with at least one side feeder which is operated as a vent. The vented extruder in combination with the side feeder can be equipped with one or more back vents in close proximity to the principal feed inlet comprising the pressure control valve. The side feeder is typically positioned in close proximity to the pressure control valve through which the superheated oligomeric polycarbonate is introduced into the extruder. The side feeder comprises at least one vent. Alternatively, the pressure control valve through which the superheated oligomeric polycarbonate is introduced may be attached to the side feeder itself in which instance the pressure control valve is attached to the side feeder at a position between the point of attachment of the side feeder to the extruder and the atmospheric vent located on the side feeder. In yet another embodiment, the superheated mixture of oligomeric polycarbonate may be introduced through multiple pressure control valves which may be attached to the side feeder, the extruder, or to both extruder and side feeder. The heated zones of the extruder are typically operated at one or more temperatures between 100° C. and 500° C. The expression "wherein the extruder is operated at a temperature between 100° C. and 500° C." refers to the heated zones of the extruder, it being understood that the extruder may comprise both heated and unheated zones, and operating at more than one temperature.

In another embodiment the superheated mixture of oligomeric polycarbonate passes through the pressure control valve into the feed section of the extruder which due to the presence of the aforementioned vents is at sub-atmospheric pressure. The ester-substituted phenol present in the superheated mixture of oligomeric polycarbonate undergoes sudden and rapid evaporation thereby effecting at least partial separation of the oligomeric polycarbonate and the ester-substituted phenol. The ester-substituted phenol vapors then are eliminated from the extruder via the back vents and forward vents. The vents can be attached to a ester-substituted phenol vapor manifold and condenser in order to recover ester-substituted phenol and prevent its adventitious release.

The vent-conveying sections of the reaction section may be operated above, at, or below atmospheric pressure. However, it is preferred that the vent-conveying sections be operated at or below atmospheric pressure. Vent-conveying sections operated at sub-atmospheric pressure are referred to herein as "vacuum vents" and are maintained between 1 mbar to 1 bar, preferably between 1 mbar to 100 mbar by a vacuum gauge measuring vacuum (as opposed to a pressure gauge measuring pressure). Typically, at least two vacuum vent-conveying sections are preferred.

In some instances, it may be found that the product polycarbonate prepared according to the method of the present invention is of insufficient molecular weight or retains too much of the ester-substituted phenol originally present in the mixture of the oligomeric polycarbonate. In such instances, simply subjecting the product polycarbonate to a second extrusion on the same or a different devolatilizing extruder typically results in a product polycarbonate having an increased molecular weight and a reduced level of residual ester-substituted phenol. Thus, in one embodiment of the present invention, the methods described above are performed on an extruder of the present invention thereby resulting in an initial product polycarbonate. The initial product polycarbonate is then introduced into a second extruder being equipped with at least one vacuum vent. The second extruder is operated at a temperature in a range between 100° C. and 500° C., and at a screw speed in a range between 50 and 1,200 rpm, thereby producing a final product polycarbonate.

The method of the present invention may be carried out in a batch or continuous mode. In one embodiment, the method of the present invention is carried out as a batch process wherein monomers, i.e. the dihydroxy compound, and transesterification catalyst are equilibrated in a batch reactor to form a mixture of the oligomeric polycarbonate. This mixture is then fed to a vented devolatilizing extruder and the product polycarbonate is isolated until the mixture is consumed. Alternatively, the method of the present invention may be carried out as a continuous process wherein dihydroxy compound, catalyst, and an ester-substituted diaryl carbonate are continuously fed to, and a mixture of oligomeric polycarbonate is continuously removed from a continuous reactor. Thus a mixture of bismethylsalicylcarbonate (i.e. BMSC), bisphenol A (i.e. BPA), and/or other dihydroxy compounds, and a transesterification catalyst may be fed to one end of a tube reactor heated to a temperature between 160° C. and 250° C., while a mixture of an oligomeric polycarbonate emerges at the opposite end of the tube reactor that is fed to the vented devolatilizing extruder from which emerges the product polycarbonate.

The Activated Diaryl Carbonate:

The activated carbonate is preferably derived from an activated diaryl dicarbonate or a mixture of an activated diaryl carbonate and diphenyl carbonate. A preferred activated diaryl carbonate of the present invention is an activated diaryl carbonate such as bismethylsalicylcarbonate (BMSC). However, as used herein the term "activated diaryl carbonate" is defined as a diarylcarbonate which is more reactive than diphenylcarbonate toward transesterification reactions. Such activated carbonates are of the general formula:

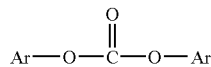

wherein Ar is a substituted aromatic radical having 6 to 30 carbon atoms. The preferred activated carbonates have the more specific general formula:

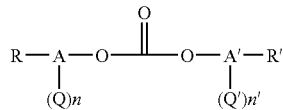

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein n+n' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, cyano groups or imine groups with structures indicated below:

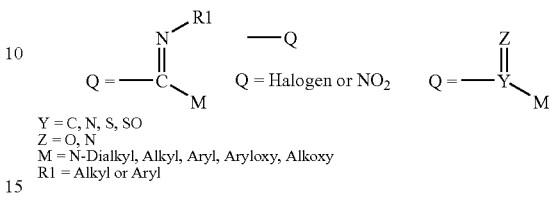

Y = C, N, S, SO
Z = O, N
M = N-Dialkyl, Alkyl, Aryl, Aryloxy, Alkoxy
R1 = Alkyl or Aryl Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl) carbonate. Unsymmetrical combinations of these structures, where the substitution number and type on A and A' are different, are also possible to employ in the current invention. A preferred structure for an activated carbonate is an ester-substituted diarylcarbonate having the structure:

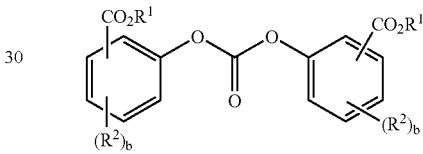

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer 0-4. At least one of the substituents $CO_2R^1$ is preferably attached in an ortho position relative to the carbonate group.

Examples of preferred ester-substituted diarylcarbonates include but are not limited to bis(methylsalicyl)carbonate (CAS Registry No. 82091-12-1), bis(ethyl salicyl)carbonate, bis(propyl salicyl) carbonate, bis(butylsalicyl) carbonate, bis(benzyl salicyl)carbonate, bis(methyl 4-chlorosalicyl)carbonate and the like. Typically BMSC is preferred for use in melt polycarbonate synthesis due to its lower molecular weight and higher vapor pressure.

One method for determining whether a certain diarylcarbonate is activated or is not activated is to carry out a model transesterification reaction between the certain diarylcarbonate with a phenol such as para-cumyl phenol. This phenol is preferred because it possesses only one reactive site, possesses a low of volatility and possesses a similar reactivity to bisphenol-A. The model transesterification reaction was carried out at temperatures above the melting points of the certain diarylcarbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diarylcarbonate. And a preferred reaction temperature is 200° C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-know detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diarylcarbonate which possesses a relative equilibrium constant ($K_{test}/K_{DPC}$) of greater than 1 is considered to possess a more favorable equilibrium than diphenylcarbonate and is an activated carbonate, whereas a diarylcarbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diarylcarbonate.

Some non-limiting examples of non-activating groups which, when present in an ortho position relative to the carbonate group, would not be expected to result in activated carbonates are alkyl, or cycolalkyl groups. Some specific and non-limiting examples of non-activated carbonates are bis(o-methylphenyl)carbonate, bis(p-cumylphenyl)carbonate, and bis(p-(1,1,3,3-tetramethyl)butylphenyl)carbonate. Unsymmetrical combinations of these structures are also expected to result in non-activated carbonates.

Unsymmetrical diarylcarbonates wherein one aryl group is activated and one aryl is unactivated or de-activated would also be useful in this invention if the activating group renders the diaryl carbonate still more reactive than diphenyl carbonate.

The carbonate may also be derived from dicarboxylic acids, dicarboxylic acid esters, or dicarboxylic acid halides. Such constituent repeating units are typically polyester-polycarbonate units. Non-limiting examples of dicarboxylic acids include terephthalic acid, isophthalic acid, sebacic acid, decanedioic acid, dodecanedioic acid, etc. Non-limiting examples of dicarboxylic acid esters include diphenyl sebacate, diphenyl terephthalate, diphenyl isophthalate, diphenyl decanedioate, diphenyl dodecanedioate, etc. Non-limiting examples of dicarboxylic acid halides include terephthaloyl chloride, isophthaloyl chloride, sebacoyl chloride, decanedioyl chloride, dodecanedioyl chloride, etc. Such polyester-polycarbonate units may be present in proportions of up to 50 mole %, preferably not more than 30 mole %, in copolymerized polycarbonates in accordance with the present invention.

The theoretical stoichiometry of the reaction within the equilibration vessel requires a molar ratio of dihydroxy compound to diaryl carbonate composition of 1:1. However, in practicing the present invention the molar ratio in the equilibration vessel is suitably between 0.25:1 to 3:1, more preferably 1:0.95 to 1:1.05 and more preferably 1:0.98 to 1:1.02.

The Dihydroxy:

The dihydroxy compound is not limited to aromatic dihydroxy compounds. However, such dihydroxy aromatic compounds are frequently preferred for use in these types of applications. It is contemplated that the dihydroxy compound comprises aliphatic diols and/or acids. The following is a non-limiting list of such compounds:

Aliphatic Diols:

Isosorbide: 1,4:3,6-dianhydro-D-sorbitol, Tricyclodecanedimethanol (TCDDM), 4,8-Bis(hydroxymethyl)tricyclodecane, Tetramethylcyclobutanediol (TMCBD), 2,2,4,4-tetramethylcyclobutane-1,3-diol, mixed isomers, cis/trans-1,4-Cyclohexanedimethanol (CHDM), cis/trans-1,4-Bis(hydroxymethyl)cyclohexane, cyclohex-1,4-ylenedimethanol, trans-1,4-Cyclohexanedimethanol (tCHDM), trans-1,4-Bis(hydroxymethyl)cyclohexane, cis-1,4-Cyclohexanedimethanol (cCHDM), cis-1,4-Bis(hydroxymethyl)cyclohexane, cis-1,2-cyclohexanedimethanol, 1,1'-bi(cyclohexyl)-4,4'-diol, dicylcohexyl-4,4'-diol, 4,4'-dihydroxybicyclohexyl, and Poly(ethylene glycol).

Acids:

1,10-Dodecanedioic acid (DDDA), Adipic acid, Hexanedioic acid, Isophthalic acid, 1,3-Benzenedicarboxylic acid, Teraphthalic acid, 1,4-Benzenedicarboxylic acid, 2,6-Naphthalenedicarboxylic acid, 3-hydroxybenzoic acid (mHBA), and 4-hydroxybenzoic acid (pHBA).

It is further contemplated that the dihydroxy composition comprises a dihydroxy aromatic compound. A preferred dihydroxy aromatic composition of the present invention is bisphenol A (BPA). However, other dihydroxy aromatic compounds of the present invention can be used and are selected from the group consisting of bisphenols having structure,

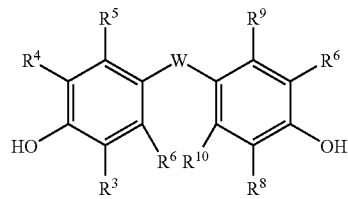

wherein $R^3$-$R^{10}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ C aryl radical; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group

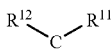

wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$, aralkyl, $C_5$-$C_{20}$ cycloalkyl groups, or a combination thereof; dihydroxy benzenes having structure

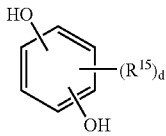

wherein $R^{15}$ is independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical, d is an integer from 0 to 4; and dihydroxy naphthalenes having structures,

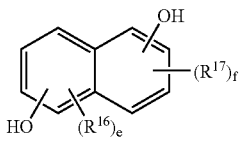 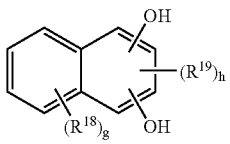

wherein $R^{16}$, $R^{17}$, $R^{18}$ and $R^{19}$ are independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical; e and f are integers from 0 to 3, g is an integer from 0 to 4, and h is an integer from 0 to 2.

Suitable bisphenols are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)-propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, and 1,4-bis(2-(4-hydroxy-3-methylphenyl)-2-propyl)benzene.

Suitable dihydroxy benzenes are illustrated by hydroquinone, resorcinol, methylhydroquinone, butylhydroquinone, phenylhydroquinone, 4-phenylresorcinol and 4-methylresorcinol.

Suitable dihydroxy naphthalenes are illustrated by 2,6-dihydroxy naphthalene; 2,6-dihydroxy-3-methyl naphthalene; and 2,6-dihydroxy-3-phenyl naphthalene.

Suitable dihydroxy naphthalenes are illustrated by 1,4-dihydroxy naphthalene; 1,4-dihydroxy-2-methyl naphthalene; 1,4-dihydroxy-2-phenyl naphthalene and 1,3-dihydroxy naphthalene.

The relative amounts of BPA and other comonomers are selected based on the desired composition of the oligomers and the resulting polycarbonate. If other comonomers are used, they can be added as part of the same feed, in a separate feed, or both.

The Volatile Residue from Activated Carbonate:

The reaction components of the present invention comprise a dihydroxy compound (which may optionally include a polycarbonate oligomer as described above), an activated carbonate, and a transesterification catalyst. As the polymerization reaction proceeds and the activated carbonate is consumed a volatile residue is produced. This volatile residue from the activated carbonate residue may be a single activated carbonate residue or a mixture activated carbonate residues and other solvents. Typically the activated carbonate residue present in the solution of the oligomeric polycarbonate comprises from 1 percent by weight to 99 percent by weight, preferably from 1 percent by weight to 70 percent by weight of the mixture. For example a solution of oligomeric bisphenol A polycarbonate dissolved in methyl salicylate is 40 percent by weight of the oligomeric polycarbonate and 60 percent by weight methyl salicylate.

In one embodiment of the present invention the activated carbonate residue is at least one ester-substituted phenol having the structure,

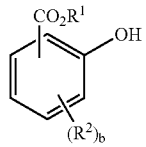

wherein $R^1$ is a $C_1$-$C_{20}$ alkyl group, $C_4$-$C_{20}$ cycloalkyl group, or $C_4$-$C_{20}$ aryl group; $R^2$ is independently at each occurrence a halogen atom, cyano group, nitro group, $C_1$-$C_{20}$ alkyl group, $C_4$-$C_{20}$ cycloalkyl group, $C_4$-$C_{20}$ aryl group, $C_1$-$C_{20}$ alkoxy group, $C_4$-$C_{20}$ cycloalkoxy group, $C_4$-$C_{20}$ aryloxy group, $C_1$-$C_{20}$ alkylthio group, $C_4$-$C_{20}$ cycloalkylthio group, $C_4$-$C_{20}$ arylthio group, $C_1$-$C_{20}$ alkylsulfinyl group, $C_4$-$C_{20}$ cycloalkylsulfinyl group, $C_4$-$C_{20}$ arylsulfinyl group, $C_1$-$C_{20}$ alkylsulfonyl group, $C_4$-$C_{20}$ cycloalkylsulfonyl group, $C_4$-$C_{20}$ arylsulfonyl group, $C_1$-$C_{20}$ alkoxycarbonyl group, $C_4$-$C_{20}$ cycloalkoxycarbonyl group, $C_4$-$C_{20}$ aryloxycarbonyl group, $C_2$-$C_{60}$ alkylamino group, $C_6$-$C_{60}$ cycloalkylamino group, $C_5$-$C_{60}$ arylamino group, $C_1$-$C_{40}$ alkylaminocarbonyl group, $C_4$-$C_{40}$ cycloalkylaminocarbonyl group, $C_4$-$C_{40}$ arylaminocarbonyl group, or $C_1$-$C_{20}$ acylamino group; and b is an integer 0-4.

Examples of ester-substituted phenols (i.e. activated carbonate residues) include methyl salicylate, ethyl salicylate, propyl salicylate, butyl salicylate, 4-chloro methyl salicylate, benzyl salicylate and mixtures thereof. Typically, methyl salicylate is preferred. Further the solvent may be recovered and reused. For example, ester-substituted phenols such as methyl salicylate may be recovered, purified, and reacted with phosgene to make ester-substituted diaryl carbonates which in turn can be used to prepare oligomeric polycarbonates. Typically, purification of the recovered ester-substituted phenol is efficiently carried out by distillation.

The Catalyst:

A typical catalyst system used in accordance with the method of the present invention is an alpha/beta catalyst system comprising a base, and preferably comprises at least one source of alkaline earth ions or alkali metal ions, and/or at least one quaternary ammonium compound, a quaternary phosphonium compound or a mixture thereof. The alpha source of alkaline earth ions or alkali metal ions being used is in an amount such that the amount of alkaline earth or alkali metal ions present in the reaction mixture is in a range between $10^{-5}$ and $10^{-8}$ moles alkaline earth or alkali metal ion per mole of dihydroxy compound employed.

The beta catalyst is quaternary phosphonium and/or quaternary ammonium compound. The quaternary ammonium is selected from the group of organic ammonium compounds having structure,

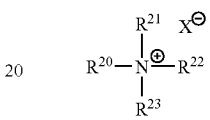

wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic quaternary ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure,

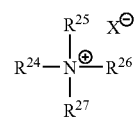

wherein $R^{24}$-$R^{27}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic quaternary phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $\frac{1}{2}(CO_3^{-2})$.

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred.

The amount of catalyst employed is typically based upon the total number of moles of dihydroxy compound employed in the polymerization reaction. When referring to the ratio of catalyst, for example phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts employed typically will be in a range between $1 \times 10^{-2}$ and $1 \times 10^{-5}$, preferably between $1 \times 10^{-3}$ and $1 \times 10^{-4}$ moles per mole of the first and second dihydroxy compounds combined. The inorganic metal hydroxide catalyst typically will be used in an amount corresponding to between $1 \times 10^{-4}$ and $1 \times 10^{-8}$, preferably $1 \times 10^{-4}$ and $1 \times 10^{-7}$ moles of metal hydroxide per mole of the first and second dihydroxy compounds combined.

In a third catalyst system according to the method of the present invention, solely an alkali metal hydroxide may be employed. As discussed above, alkali metal hydroxides are illustrated by sodium hydroxide, lithium hydroxide, and potassium hydroxide. Due to its relatively low cost, sodium hydroxide is often preferred.

EXAMPLES

The following examples are set forth to provide those of ordinary skill in the art with a detailed description of how the methods claimed herein are used, and are not intended to limit the scope of what the inventors regard as their invention. Unless indicated otherwise, parts are by weight, temperature is in ° C.

Comp. Ex. 1, Inv. Ex. 1, Inv. Ex. 2, and Conditions

An oligomeric polycarbonate mixture was prepared by the oligomerization of bis phenol A (BPA) and bis-methyl salicyl carbonate (BMSC) in a stirred reactor with a molar ratio of 1.02 (BMSC/BPA) at a temperature of 170° C. Before heating up the reactor 25 micro equivalents of TMAH and 4 micro equivalents of NaOH was added to the reactor. The pressure in the reactor during oligomerization is 800 mbar. After 4 hours of oligomerization the oligomer had reached equilibrium and contained 55% methyl salicylate (MS). Then the temperature of the reactor was increased to 200° C. and the pressure reduced to 300 mbar. At these conditions MS was removed until the content MS in the reactor was 15%.

Figure 5:
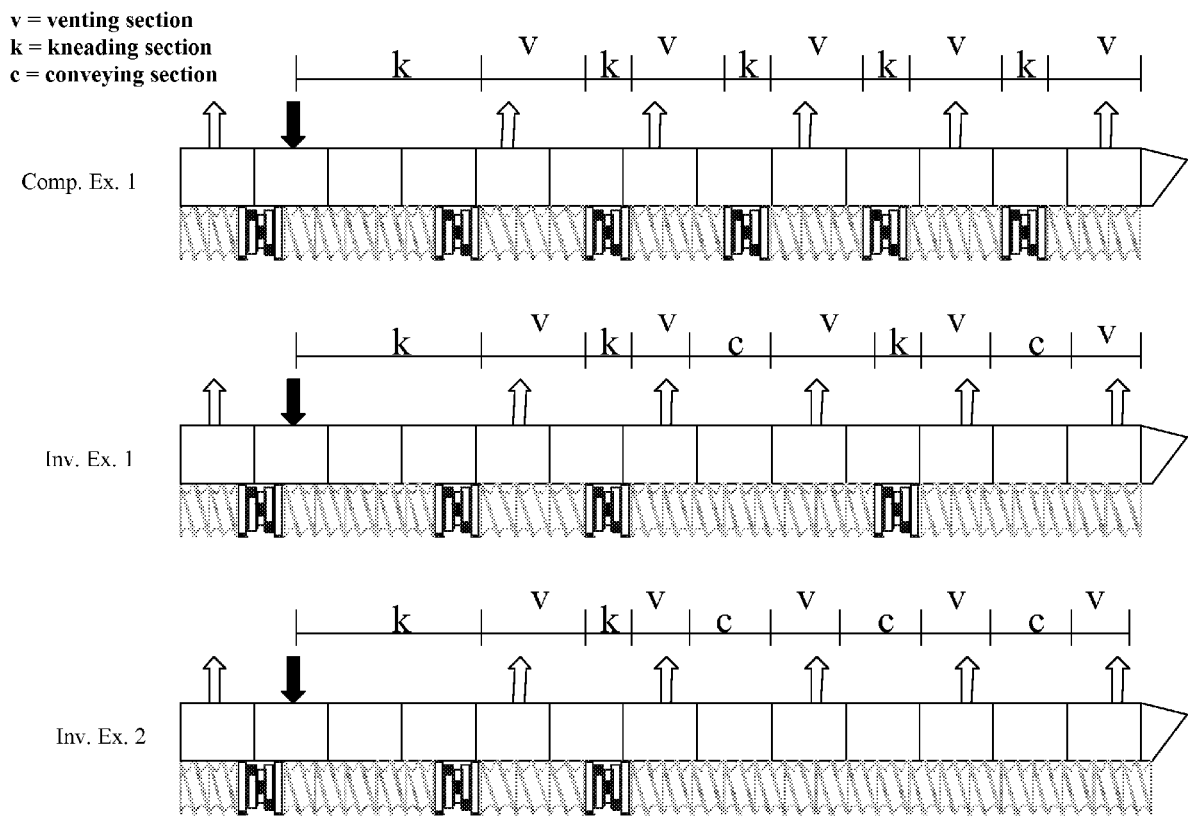
FIG. 5 shows side views of extruder configurations used in the examples section below.

The prepared oligomeric polycarbonate mixture was pumped to a 25 mm twin-screw extruder (as depicted in FIG. 5) with an L/D of 59. The oligomer was injected in the second barrel of the extruder. There was a ventport on the first barrel of the extruder (i.e. a backvent) and there was 5 ventports downstream of the injection point starting with forward vent 1 (a.k.a FV 1) closest to the feed port and ending at forward vent 5 (a.k.a. FV 5) located immediately prior to the polycarbonate exit port of the extruder. The extruder had two vacuum systems called Lo-vac system and hi-vac system. The backvent and FV 1 were connected to the lo-vac system. FVs 2-5 were connected to the hi-vac system.

In these experiments three different screw designs were evaluated. These screw designs were coded Comparative Example 1 (Comp. Ex. 1), Invention Example 1 (Inv. Ex. 1), and Invention Example 2 (Inv. Ex. 2). The screw design in Comparative Example 1, as illustrated in FIG. 5, had a kneading section between the injection point of the reaction components and FV 1. After FV1 there was a kneading section between all of FV 2-FV 5 ventports. The kneading section between FV 1 and FV 2 consisted of two 3-lobe kneading elements, a ZME-element and a left-handed conveying element. The kneading sections between the other ventports consisted of a ZME element and a left-handed kneading element.

In the screw design of Invention Example 1 the kneading sections between FV 2 and FV 3 and between FV 4 and FV 5 were removed and replaced by conveying sections having screw element configurations consisting of one or more conveying elements and no kneading elements. In the screw design of Invention Example 2, in addition to the replacement of the kneading section with the conveying sections of Invention Example 1, the kneading section between FV 3 and FV 4 was removed and also replaced with a conveying section. In other words, from FV 2 to the polycarbonate exit section, the screw design of Invention Example 2, only consists of conveying elements with vent-conveying sections along the extruder. See FIG. 5.

For each screw design described above samples were collected at 10 different conditions on the extruder. Each condition was a combination of screwspeed and polymer rate. The screwspeed varied from 300 rpm to 600 rpm. The polymer rate was determined by using fixed ratios of polymer rate divided by screwspeed. Three different ratios were used: low=0.024, medium=0.03 and high=0.036 (the terms low, medium, and high only describe the values of the examples of the present invention). Table 1 shows an overview of the polymer rate and screwspeed for each condition. Table 2 shows an overview of the vacuum pressures at the backvent (BV), and the forward vents (FVs 1-5).

TABLE 1

Overview of polymer rate and screwspeed for each condition

| | | | | | Condition | | | | | |
|---|---|---|---|---|---|---|---|---|---|---|
| | 1 | 2 | 3 | 4 | 5 | 6 | 7 | 8 | 9 | 10 |
| | | | | | Screwspeed (rpm) | | | | | |
| | 300 | 300 | 400 | 400 | 400 | 500 | 500 | 500 | 600 | 600 |
| | | | | | Polymer rate (kg/hr) | | | | | |
| | 8.7 | 10.6 | 9.6 | 11.9 | 14.3 | 11.7 | 14.8 | 18.1 | 14.2 | 17.9 |
| rate/screw speed | medium | high | low | medium | high | low | medium | high | low | medium |

TABLE 2

Overview example vent pressures

| | | Condition | | | | | | | | | |
|---|---|---|---|---|---|---|---|---|---|---|---|
| | | 1 | 2 | 3 | 4 | 5 | 6 | 7 | 8 | 9 | 10 |
| | | | | | | Screwspeed (rpm) | | | | | |
| | | 300 | 300 | 400 | 400 | 400 | 500 | 500 | 500 | 600 | 600 |
| | | | | | | Polymer rate (kg/hr) | | | | | |
| | | 8.7 | 10.6 | 9.6 | 11.9 | 14.3 | 11.7 | 14.8 | 18.1 | 14.2 | 17.9 |
| BV (mbar) | Comp. Ex. 1 | 3.5 | 4.1 | 3.9 | 4.1 | 4.9 | 4.2 | 5 | 6 | 5 | 5.4 |
| | Inv. Ex. 1 | 4.2 | 4.1 | 4 | 4.7 | 5.2 | 4.8 | 5.7 | 6.3 | 5.4 | 6.2 |
| | Inv. Ex. 2 | 3.8 | 4.4 | 4 | 4.5 | 5.7 | 4.8 | 6 | 7.9 | 5.8 | 7 |
| FV 1 (mbar) | Comp. Ex. 1 | 1.1 | 2 | 1.8 | 1.9 | 1.2 | 2.1 | 2.5 | 3.2 | 2.5 | 3 |
| | Inv. Ex. 1 | 3.2 | 2.1 | 2.1 | 2.4 | 2.5 | 2.4 | 2.7 | 3.1 | 2.5 | 3 |
| | Inv. Ex. 2 | 2.1 | 2 | 2 | 2.1 | 2.2 | 2.2 | 2.4 | 2.8 | 2.3 | 2.8 |
| FV 2–5 (mbar) | Comp. Ex. 1 | 0.4 | 0.6 | 0.6 | 0.6 | 0.4 | 0.6 | 0.7 | 0.9 | 0.7 | 0.9 |
| | Inv. Ex. 1 | 2.1 | 1.7 | 1.6 | 1.7 | 1.7 | 1.7 | 1.8 | 1.9 | 1.7 | 1.8 |
| | Inv. Ex. 2 | 1.5 | 1.5 | 1.5 | 1.5 | 1.5 | 1.6 | 1.6 | 1.7 | 1.6 | 1.7 |

Results Comp. Ex. 1, Inv. Ex. 1, and Inv. Ex. 2

Molecular weights were determined by GPC analysis of solutions of 1 mg/ml of the polymers dissolved in di-chloromethane. All the molecular weight results are given as values relative to polycarbonate.

The free methyl salicylate in the polymers was measured by means of HPLC. The final resin was dissolved in di-chloromethane. The polymer was precipitated by adding methanol and separated from the mixture. The amount of methyl salicylate is reported in ppm. Table 3 shows the residual methyl salicylate in the extruded polycarbonate product.

As shown in Invention Examples 1 and 2, by replacing two of the kneading sections of the extruder of Comparative Example 1 with conveying sections having of one or more conveying elements, the resulting extruded product polycarbonate shows a substantial improvement in the content of residual MS for all tested extruder conditions.

By removing yet another kneading section, as demonstrated in the screw design of Invention Example 2, the resulting extruded product polycarbonate shows that the content of residual MS is increased as compared to the screw design in

TABLE 3

Residual MS in polycarbonate product

| | | Condition | | | | | | | | | |
|---|---|---|---|---|---|---|---|---|---|---|---|
| | | 1 | 2 | 3 | 4 | 5 | 6 | 7 | 8 | 9 | 10 |
| | | | | | | Screwspeed (rpm) | | | | | |
| | | 300 | 300 | 400 | 400 | 400 | 500 | 500 | 500 | 600 | 600 |
| | | | | | | Polymer rate (kg/hr) | | | | | |
| | | 8.7 | 10.6 | 9.6 | 11.9 | 14.3 | 11.7 | 14.8 | 18.1 | 14.2 | 17.9 |
| Residual MS (ppm) | Comp. Ex. 1 | 341 | 582 | 229 | 479 | 915 | 292 | 661 | 1448 | 739 | 1011 |
| | Inv. Ex. 1 | 186 | 308 | 133 | 238 | 443 | 153 | 322 | 612 | 203 | 431 |
| | Inv. Ex. 2 | 281 | 409 | 207 | 350 | 568 | 252 | 469 | 732 | 314 | 557 |

Discussion Comp. Ex. 1, Inv. Ex. 1, and Inv. Ex. 2

Comparative Example 1 illustrates an extruder having kneading section between each ventport. This section is designed in such a way that there is a melt seal between each ventport. The function of the kneading section is to prevent the vacuum pressures at the different ventports from influencing each other and it promotes the surface renewal for effective devolatilization of the MS. It has been found, that a disadvantage of this approach is that at each of the kneading sections, the barrel is completely filled with polymer. When the extruder is filled with polymer, devolatilization will be limited and the removal of the MS will be hindered.

Invention Example 1, but that it is still lower when compared to the screw design of Comparative Example 1.

Inv. Ex. 3, Inv. Ex. 4, and Conditions

Figure 6:
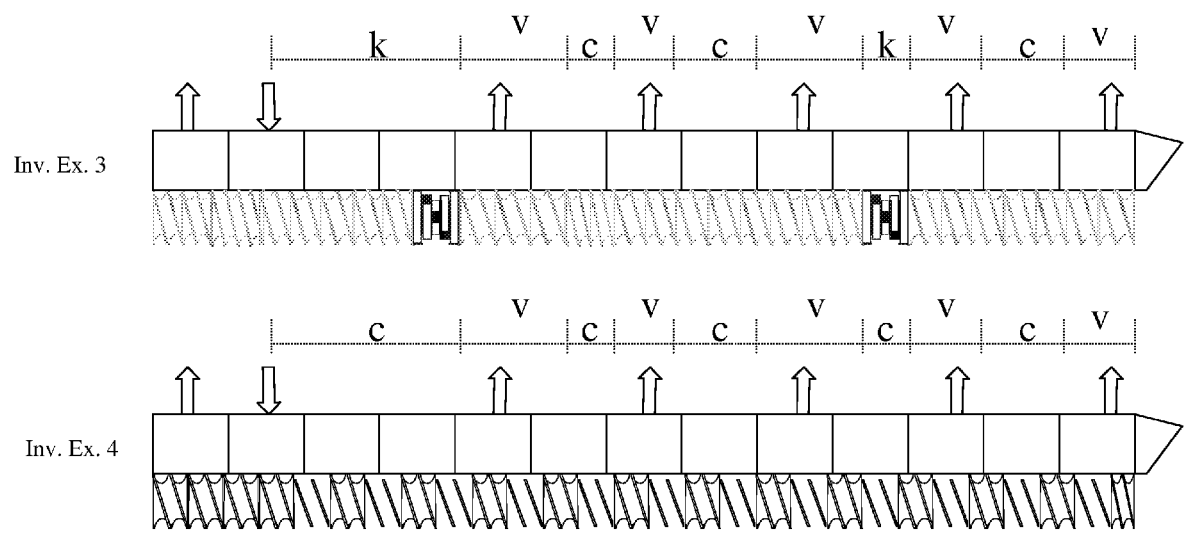
FIG. 6 shows more side views of extruder configurations used in the examples section below.

An oligomeric polycarbonate mixture was prepared in a similar fashion as described above with respect to Comp. Ex. 1, Inv. Ex. 1, and Inv. Ex. 2. The oligomeric mixture was then pumped to a 25 mm twin-screw extruder (as depicted in FIG. 6) with an L/D of 59. The oligomer was injected in the second barrel of the extruder. There was a ventport on the first barrel of the extruder (i.e. a backvent) and there were 5 ventports downstream of the injection point starting with forward vent 1 (a.k.a FV1) closest to the feed port and ending at forward vent 5 (a.k.a. FV 5) located prior to the polycarbonate exit port of the extruder. The extruder had vacuum system connected to the vents operating at 1 mbar.

In these experiments two different screw designs were evaluated. These screw designs were coded Invention Example 3 (Inv. Ex. 3), and Invention Example 4 (Inv. Ex. 4). The screw design in Inv. Example 3, as illustrated in FIG. 6, had a kneading section between the injection point of the reaction components and the first vent-conveying section as well as a kneading section disposed between the third and fourth vent-conveying sections. Conveying sections consisting of conveying elements were disposed between the first, second, and third vent-conveying sections as well as between the fourth and the fifth vent-conveying sections. In all conveying and vent-conveying sections the screw element configuration consisted of conveying element and no mixing elements. The kneading sections comprised a kneading element that created a melt seal within the extruder at that point.

In the reaction section design of Invention Example 4, the kneading sections of Inv. Ex. 3 were replaced with conveying sections. Further in all conveying and vent-conveying sections the screw element configuration comprises mixing elements and conveying elements disposed in alternating order to provide an array of the configuration ((ME)(CE)) along the length of the extruder. See FIG. 6.

For the screw designs in Inv. Ex.'s 3 and 4 described above samples were collected at 10 different conditions on the extruder. Each condition was a different combination of screwspeed and polymer rate. The screwspeed varied from 300 rpm to 600 rpm. The polymer rate was determined by using fixed ratios of polymer rate divided by screwspeed. Table 4 shows an the results of the different runs.

TABLE 4

Results of Inv. Exs. 3 & 4

| | | Condition | | | | | | | | | |
|---|---|---|---|---|---|---|---|---|---|---|---|
| | | 1 | 2 | 3 | 4 | 5 | 6 | 7 | 8 | 9 | 10 |
| | | | | | | Screwspeed (rpm) | | | | | |
| | | 300 | 300 | 400 | 400 | 400 | 500 | 500 | 500 | 600 | 600 |
| | | | | | | Polymer rate (kg/hr) | | | | | |
| | | 8.7 | 10.6 | 9.6 | 11.9 | 14.3 | 11.7 | 14.8 | 18.1 | 14.2 | 17.9 |
| Residual MS (ppm) | Inv. Ex. 3 | 337 | 468 | 198 | 379 | 677 | 238 | 488 | 914 | 299 | 629 |
| | Inv. Ex. 4 | 136 | 245 | 136 | 192 | 374 | 119 | 250 | 578 | 192 | 381 |

Discussion Inv. Ex. 3, and Inv. Ex. 4

Comparing the results of Inv. Ex. 3 to Inv. Ex. 4 shows that a low concentration of methyl salicylate can be achieved in product polycarbonate using the extruder designs of the present invention. Further methyl salicylate concentration of product polycarbonate can be further reduced where there are no melt seals created in the extruder barrel (Inv. Ex. 4) and where the extruder screw configuration in each of the conveying and vent-conveying sections comprises both mixing and conveying elements arranged in an alternating array of CEs and MEs to increase the surface renewal of the reaction components within the extruder.

The invention claimed is:

1. A method for preparing polycarbonate wherein the method comprises the steps of,
   (i) introducing to an extruder through one or more feed sections, a plurality of reaction components comprising a dihydroxy compound, an activated carbonate, and a transesterification catalyst, wherein the extruder comprises: (a) a first feed section; (b) a polycarbonate exit section; and (c) a reaction section disposed between the first feed section and the polycarbonate exit section, the reaction section comprising one or more devolatilization units, wherein each devolatilization unit comprises an array of vent-conveying sections and conveying sections arranged in a configuration selected from the group consisting of:

$(CVC)_x(V)_n$, and $(VCV)_x(C)_n$ wherein (V) is a vent-conveying section, (C) is a conveying section, x is 1 or more, and n is 1 or 0, wherein the extruder screw in the vent-conveying sections and the conveying sections in each devolatilization unit comprises screw elements selected from the group consisting of mixing elements and conveying elements and no elements that create a melt seal within the devolatilization unit, and (ii) extruding the plurality of reaction components at a temperature in a range between 100° C. and 500° C., wherein during the extrusion of the reaction components a volatile residue from the activated carbonate is removed from each devolatilization unit, and polycarbonate is removed through the polycarbonate exit section.

2. The method of claim 1, wherein the extruder screw in the vent-conveying sections and the conveying sections in a devolatilization unit consists of mixing elements and conveying elements.

3. The method of claim 2, wherein the extruder screw in the vent-conveying sections and the conveying sections in a devolatilization unit comprises an array of mixing elements and conveying elements arranged in a configuration selected from the group consisting of:

$((CE)(ME))_y(CE)_m$, and $((ME)(CE))_y(ME)_m$ wherein CE is a conveying element, ME is a mixing element, and y is 2 or more, and m is 1 or 0.

4. The method of claim 3, wherein y is 3 or more.

5. The method of claim 1, wherein the reaction section comprises more than one devolatilization unit.

6. The method of claim 5, wherein the extruder screw in the vent-conveying sections and the conveying sections of each of the devolatilization units consists of conveying elements.

7. The method of claim 5, wherein the extruder screw in the vent-conveying sections and the conveying sections of a devolatilization unit consists of mixing elements and conveying elements.

8. The method of claim 7, wherein the extruder screw in the vent-conveying sections and the conveying sections of the devolatilization unit comprises an array of mixing elements and conveying elements arranged in a configuration selected from the group consisting of:

$((CE)(ME))_y(CE)_m$ $((ME)(CE))_y(ME)_m$ wherein CE is a conveying element, ME is a mixing element, and y is 2 or more, and m is 1 or 0.

9. The method of claim 8, wherein y is 3 or more.

10. The method of claim 1, wherein the reaction section comprises one or more vent-conveying sections outside of the devolatilization unit, and further comprises one or more kneading sections, wherein either a vent-conveying section or a devolatilization unit separates the kneading sections.

11. The method of claim 10, wherein the devolatilization unit, the one or more kneading sections, and the vent-conveying sections outside of the devolatilization unit comprises a configuration selected from the group consisting of:

$KV(KVCV)_n$, (1)

$(KV)_p(CV)_m$, and (2)

$(KV)_q(CV)_r(KV)_s$ (3)

wherein K is a kneading section, V is a vent-conveying section, and C is a conveying section; n is 1, 2, or 3; p is 1, 2, or 3; m is 2, 3, or 4; q is 1, 2, or 3; r is 1 or 2; s is 1 or 2.

12. The method of claim 11, wherein the extruder screw in each of the vent-conveying sections and each of the conveying sections consists of conveying elements.

13. The method of claim 11, wherein the extruder screw in a vent-conveying section and a conveying section consists of mixing elements and conveying elements.

14. The method of claim 13, wherein the extruder screw in a vent-conveying section and a conveying section comprises an array of mixing elements and conveying elements arranged in a configuration selected from the group consisting of:

$((CE)(ME))_y(CE)_m$, and $((ME)(CE))_y(ME)_m$ wherein CE is a conveying element, ME is a mixing element, and y is 2 or more, and m is 1 or 0.

15. The method of claim 14, wherein y is 3 or more.

16. The method of claim 11, wherein the devolatilization units, the one or more kneading sections, and the vent-conveying sections outside of the devolatilization units comprise a configuration of:

$KV(KVCV)_n$, wherein K is a kneading section; V is a vent-conveying section; C is a conveying section; and n is 1, 2, or 3.

17. The method of claim 16, wherein n is 2.

18. The method of claim 11, wherein the devolatilization units, the one or more kneading sections, and the vent-conveying sections outside of the devolatilization units comprise a configuration of:

$(KV)_p(CV)_m$, wherein K is a kneading section; V is a vent-conveying section; C is a conveying section; p is 1, 2, or 3; and m is 2, 3, or 4.

19. The method of claim 18, wherein p is 2 and m is 3.

20. The method of claim 11, wherein the devolatilization units, the one or more kneading sections, and the vent-conveying sections outside of the devolatilization units comprise a configuration of:

$(KV)_q(CV)_r(KV)_s$ wherein K is a kneading section; V is a vent-conveying section; C is a conveying section; q is 1, 2, or 3; r is 1 or 2; and s is 1 or 2.

21. The method of claim 20, wherein q is 2, r is 1, and s is 1.

22. The method of claim 1, wherein prior to introducing the plurality of reaction components to the extruder through the one or more feed sections, the method further comprises the steps of:

forming a reaction mixture comprising the plurality of reaction components, and heating the reaction mixture at a temperature in a range between 100° C. and 500° C. to provide the plurality of reaction components, wherein the plurality of reaction components further comprise a polycarbonate oligomer.

23. The method of claim 1, wherein the extruder comprises more than one devolatilization unit and wherein the extruder screw in the vent-conveying sections and the conveying sections in each devolatilization unit consists of mixing elements and conveying elements, and wherein the extruder screw in the vent-conveying sections and the conveying sections in each devolatilization unit comprises an array of mixing elements and conveying elements arranged in a configuration selected from the group consisting of:

$((CE)(ME))_y(CE)_m$, and $((ME)(CE))_y(ME)_m$ wherein CE is a conveying element, ME is a mixing element, and y is 2 or more, and m is 1 or 0.

24. The method of claim 23, wherein y is 3 or more.

25. An extruder comprising: (a) a first feed section; (b) a polycarbonate exit section; and (c) a reaction section disposed between the first feed section and the polycarbonate exit section, the reaction section comprising one or more devolatilization units, wherein each devolatilization unit comprises an array of vent-conveying sections and conveying sections arranged in a configuration selected from the group consisting of:

$(CVC)_x(V)_n$, and $(VCV)_x(C)_n$ wherein (V) is a vent-conveying section, (C) is a conveying section, x is 1 or more, and n is 1 or 0, wherein the extruder screw in the vent-conveying sections and the conveying sections in each devolatilization unit comprises screw elements selected from the group consisting of mixing elements and conveying elements and no elements that create a melt seal in the devolatilization unit.

26. The extruder of claim 25, wherein the extruder screw in the vent-conveying sections and the conveying sections in a devolatilization unit consists of mixing elements and conveying elements comprising an array of mixing elements and conveying elements arranged in a configuration selected from the group consisting of:

$$((CE)(ME))_y(CE)_m, \text{ and}$$

$$((ME)(CE))_y(ME)_m$$

wherein CE is a conveying element, ME is a mixing element, and y is 2 or more, and m is 1 or 0.

27. The extruder of claim 26, wherein y is 3 or more.

28. The extruder of claim 25, wherein the reaction section comprises more than one devolatilization unit and at least one kneading section, wherein a kneading section is disposed between each of the devolatilization units.

29. The extruder of claim 28, wherein the extruder screw in the vent-conveying sections and the conveying sections of a devolatilization unit consists of conveying elements.

30. The extruder of claim 28, wherein the extruder screw in the vent-conveying sections and the conveying sections of a devolatilization unit consists of mixing elements and conveying elements, comprising an array of mixing elements and conveying elements arranged in a configuration selected from the group consisting of:

$$((CE)(ME))_y(CE)_m, \text{ and}$$

$$((ME)(CE))_y(ME)_m$$

wherein CE is a conveying element, ME is a mixing element, and y is 2 or more, and m is 1 or 0.

31. The extruder of claim 30, wherein the reaction section comprises one or more vent-conveying sections outside of the devolatilization units, and further comprises one or more kneading sections, wherein a vent-conveying section or a devolatilization unit separates the kneading sections.

32. The extruder of claim 31, wherein the devolatilization units, the one or more kneading sections, and the vent-conveying sections outside of the devolatilization units comprise a configuration selected from the group consisting of:

$$KV(KVCV)_n, \tag{1}$$

$$(KV)_p(CV)_m, \text{ and} \tag{2}$$

$$(KV)_q(CV)_r(KV)_s \tag{3}$$

wherein K is a kneading section, V is a vent-conveying section, and C is a conveying section; n is 1, 2, or 3; p is 1, 2, or 3; m is 2, 3, or 4; q is 1, 2, or 3; r is 1 or 2; s is 1 or 2.

33. The extruder of claim 32, wherein the extruder screw in a vent-conveying section and a conveying section consists of conveying elements.

34. The extruder of claim 32, wherein the extruder screw in the vent-conveying sections and the conveying sections of a devolatilization unit consists of mixing elements and conveying elements comprising an array of mixing elements and conveying elements arranged in a configuration selected from the group consisting of:

$$((CE)(ME))_y(CE)_m, \text{ and}$$

$$((ME)(CE))_y(ME)_m$$

wherein CE is a conveying element, ME is a mixing element, and y is 3 or more, and m is 1 or 0.

35. The extruder of claim 25, wherein the extruder comprises more than one devolatilization unit and wherein the extruder screw in the vent-conveying sections and the conveying sections in each devolatilization unit consists of mixing elements and conveying elements, and wherein the extruder screw in the vent-conveying sections and the conveying sections in each devolatilization unit comprises an array of mixing elements and conveying elements arranged in a configuration selected from the group consisting of:

$$((CE)(ME))_y(CE)_m, \text{ and}$$

$$((ME)(CE))_y(ME)_m$$

wherein CE is a conveying element, ME is a mixing element, and y is 2 or more, and m is 1 or 0.

36. The extruder of claim 35, wherein y is 3 or more.

* * * * *